United States Patent [19]

Trejo Gonzalez

[11] 4,231,834
[45] Nov. 4, 1980

[54] PROCESS TO MANUFACTURE TUBULAR ARTICLES RESEMBLING WOOD, CANE, BAMBOO, REED, WICKER, RATTAN, RUSH, AND THE LIKE

[76] Inventor: Humberto Trejo Gonzalez, Av. Presidentes No. 52, Mexico City 13, Mexico

[21] Appl. No.: 11,006

[22] Filed: Feb. 9, 1979

Related U.S. Application Data

[63] Continuation-in-part of Ser. No. 893,850, Apr. 6, 1978, abandoned.

[30] Foreign Application Priority Data

May 30, 1977 [MX] Mexico .................................. 169238
May 30, 1977 [MX] Mexico .................................. 169239
May 30, 1977 [MX] Mexico .................................. 169244

[51] Int. Cl.³ ...................... B29C 17/07; B29C 27/14
[52] U.S. Cl. .................................... 156/294; 156/61;
156/86; 156/244.13; 156/244.14; 248/188;
249/170; 264/150; 264/167; 264/177 R;
264/230; 264/245; 264/341; 264/564;
425/326.1; 425/442; 425/450.1; 425/451
[58] Field of Search ............... 264/150, 230, 148, 167,
264/75, 73, 245, 177 R, 341, 209, 564–565;
156/85, 86, 296, 61, 244.13, 244.14, 294;
248/188; 428/36; 249/170; 425/450.1, 442, 451,
326.1, 325, 387.1

[56] References Cited

U.S. PATENT DOCUMENTS

| | | | |
|---|---|---|---|
| 2,316,143 | 4/1943 | Peebles et al. | 264/226 |
| 2,663,911 | 12/1953 | Waag et al. | 264/341 |
| 2,936,009 | 5/1960 | McGuire | 248/188 |
| 3,226,285 | 12/1965 | Iovenko | 264/167 |
| 3,280,847 | 10/1966 | Chisholm et al. | 264/230 |
| 3,297,063 | 1/1967 | McGuire | 248/188 |
| 3,414,118 | 12/1968 | Jacobson | 264/230 |
| 3,620,896 | 11/1971 | Glasgow | 156/85 |
| 3,664,790 | 5/1972 | Hollander | 264/75 |
| 3,751,541 | 8/1973 | Hegler | 425/326.1 |
| 3,844,700 | 10/1974 | Sokolow | 425/326.1 |

Primary Examiner—Jeffery R. Thurlow
Attorney, Agent, or Firm—Ladas & Parry

[57] ABSTRACT

This invention relates to the production of tubular articles, made from synthetic thermoplastic materials, which resemble wood, rattan, bamboo, cane, reed, wicker, reed, rush, and similar natural materials, and also to the production of furniture, structures, and every kind of ornament in general employing thermoplastic materials which replace the natural materials mentioned above, coloring and veining such thermoplastic materials, and also joining and securing by means of ties made from rigid, semi-rigid or plastified polyvinyl the natural and artificial materials above mentioned, for the purpose of assembling furniture and structures in general.

22 Claims, 19 Drawing Figures

PROCESS TO MANUFACTURE TUBULAR ARTICLES RESEMBLING WOOD, CANE, BAMBOO, REED, WICKER, RATTAN, RUSH, AND THE LIKE

CROSS REFERENCE TO RELATED APPLICATIONS

This application is a continuation-in-part application to my co-pending application Ser. No. 893,850, filed on Apr. 6, 1978 now abandoned.

BACKGROUND OF THE INVENTION

Up to the present time no process such as that of the present application has been known for producing articles similar to the natural materials above mentioned; what is known in the art is the production of pieces of cast metal or ceramics, obtained by means of molds. The effort has been made to produce rigid plastic articles, similar to such natural materials. However, success has not been achieved in imitating bamboo, and the the invention is accordingly limited to the reproduction of simulated bamboo.

Up to the present time pieces of furniture such as chairs, rockers, headrests, shelves, tables and the like have been produced from rattan, bamboo and other natural materials, which have an extremely high cost and which require a great deal of maintenance; furthermore they cannot be used out of doors because of their low resistance to the elements, and are also easily broken, since these natural materials are not sufficiently strong to bear fairly great weight.

In the specific case of rattan, it is well known that this material is scarce, since it grows only in Eastern countries, and very expensive; it is also difficult to work and requires selection; finally the pieces made from it cannot be used out of doors.

Furniture made from natural materials, such as a chair or a rocker, generally include cushions which are covered with cloth, other textile material, plastic, or leather; these cushions are supported by a reed or wickerwork woven structure built into the piece of furniture, presenting the same drawbacks as pointed out above. An additional problem arises from the method required for weaving wickerwork, since it must be kept submerged in water to give it flexibility and ease of manipulation. This method, besides being slow, is dirty, and there is always the risk of wetting delicate portions of the furniture.

The procedures for coloring or veining various articles of different materials such as ceramics and metal, and making them resemble the veining of wood, have consisted merely of coloring or dying the surface of the materials, later applying a coat of varnish or lacquer to provide a brilliant surface, or merely of applying on the surface thin layers of printed wallpaper that simulated the veining of wood.

These processes have the disadvantage that they are not very appropriate for application to thermoplastic materials, since paints or dyes generally do not show good adherence to these synthetic materials; and consequently the application of any solvent, however weak, or mere use and exposure produce deterioration and removal of the paint, leaving the synthetic material exposed and unprotected.

The procedures known heretofore for typing knots for this type of furniture, using straps or strips of rattan bark, reeds, rushes or rawhide have the drawback that they must be secured by means of nails or other device. These ties also have poor resistance to weathering, and also the tendency to stretch or shrink with changes of temperature; they also eventually get dirty, rot, and fail.

These systems of typing are very well known, as is the use of natural materials for carrying them out, as proposed for example in U.S. Pat. Nos. 2,936,009 and 3,297,063 of John C. McGuire, in which rawhide is used to make the ties, which are secured in place with nails, tacks, etc.

SUMMARY OF THE INVENTION

In view of what is set forth above, it is the object of the present invention to produce articles which are identical to the eye and to the touch with those made of natural materials, such as rattan, bamboo, cane, reed, wicker and the like, but which are made of rigid thermoplastic materials having an appearance like that of the natural materials but being more durable and of comparatively lower cost than the said natural materials, and furthermore being easy to work in all sizes and diameters, and being susceptible of mass production in every type and color desired of the natural material it is intended to imitate.

Another object of the present invention is to form protuberances which simulate the knotty and non-symmetrical portions, with ridges and marking, similar to the irregularities of the natural material. Once this phase has been completed, the tubular lengths are thermally molded, giving suitable shape to the sections which will make up the furniture and structures.

By means of the procedure for coloring and veining the synthetic thermoplastic materials of the present invention, all of the problems above mentioned are avoided, since the paint or pigment with which the surface of the synthetic thermoplastic materials is to be colored or grained is dissolved in a solvent effective upon the thermoplastic material. If desired, when the pigment is dissolved in the solvent, a small amount of the thermoplastic material itself which is to be veined can be dissolved, thus achieving a better adherence upon applying the coloring or veining applied to the surface of the synthetic thermoplastic material, causing the coloring or pigment to be absorbed into and form part of the material itself when the solvent evaporates. In this way the said pigment is intimately infused within the material and it is very difficult for the veining to be removed either by wearing aways of the material, by the application of some light solvent applied to the surface, or by weathering.

The advantage is also obtained that these synthetic articles are light but strong and easy to work, and present an appearance which is identical in looks and feel to the natural materials, and can be used indoors and outdoors with no maintenance. In imitations of wood graining, very rare and costly woods can be simulated avoiding the use of the natural materials, limiting importation and excessive exploitation of forests.

Another advantage of the present invention is that of providing a way of joining the furniture, structures and ornaments in general, whether of natural or synthetic materials, by means of typing them with narrow strips or ribbons of Polyvinyl chloride. Before the tubular portions are tied, however, they have to be attached to each other by simple soldering, by attaching a plug or stopper and screw at the end of the other portion; or by other connecting means such as an injected plastic connector also attached to the ends of the tubes. Afterwards, a better and permanent fastening is obtained, for the reason that after the tie of PVC is heated by means of applying heat or microwave treatment, or without heat through the action of time at ambient temperature, it contracts permanently and provides a very firm and tight tie in an elastic manner. Such a tie will neither slacken nor release, notwithstanding later application of heat or cold, and will not permit the joints to open. This characteristic is heightened by forming striations or grooves in one or both surfaces at the moment of extrusion to give the material greater adherence, and making it unnecessary to use any other means of locking engagement such as nails, staples, bonding, adhesives and the like; it is necessary only to link the ends of the tie together suitably.

The strips or ribbons of PVC can be molecularly oriented in the lengthwise direction, as is well-known in the field of heat-shrinking plastics under the term "memory", at the time of their extrusion, so that when heat, light or microwave treatment is applied, or through the mere effect of the ambient temperature they will undergo permanent shrinking thus tightening the tie made with this material.

The ties or ribbons of PVC can be colored like the tubular sections to give them an appearance similar to that of natural materials such as reed, wicker, rattan bark, cane, bamboo and the like, cut lengthwise, as well as of rawhide strips, etc.

The ties made of PVC also provide the important advantage that they do not rot nor permit absorption of moisture nor dust. They can be used out of doors, giving a natural and esthetically pleasing appearance and better resistance to weathering, and stay tight even when the material tied expands or contracts; thus they give much firmer joints than natural materials known up to the present time.

The tie of PVC of the present invention can be used on natural materials with the same advantages described above or firmness combined with a natural appearance.

In the case of furniture made with natural or with synthetic materials which have cushions on the seat portion, the use of contractable PVC strip or ribbon of uniform base color, with a cross-sectional shape which can be round, oval, flat or rectangular, in suitable lengths and widths as desired, upon which very fine lengthwise striations have been formed, and which has been given a grained appearance according to the method described above, affords the advantages already cited above and others as well.

The interlacing which serves as base for the seats, or for structural or merely ornamental purposes, can be made of PVC strip, with important advantages over natural materials. In some pieces of furniture the tubular profile, knotted and veined, can be the peripheral structure, and the interweaving performed with PVC strip will give the precise appearance of furniture made of wickerwork.

This interweaving has been tried with other materials and other techniques, but it has not been possible in these cases to get away from the artificial appearance.

Another additional advantage is that this material can be worked on when cold and dry, without the need for special treatments and without dirtying the piece of furniture, along with the advantages of tensioning and resistance to weathering already mentioned.

In the case of furnitures made to imitate bamboo, the strips of split bamboo are replaced with similar strips of PVC extrusions and a plank can be formed and incorporated into the piece of furniture, texturizing it with striations and veining it in the manner already described.

The materials that are imitated according to the instant invention belong most of them to the grass family and are known for their following characteristics:

(1) Bamboo (technical name Bambusaceae).—tall plant with hard, hollow, jointed stems, of the grass family; stem, used as a stick or support.

(2) Rattan (technical name Calamus Rotang).—East Indian palmtree with a cane-like stem. The commercially called reed used in the manufacture of chairs, baskets, etc, is the split inner portion of rattan in cylindrical form, like true reeds.

Rattan is usually known as reed, when used for woven furniture. (Encyclopedia Americana).

The rattan vine is harvested by natives, then cured and classified as to size and texture, the bark is removed and treated, thus becoming "cane" and used most extensively as seats for chairs.

The wood part of the rattan vine inside the bark is treated and the finished product is known as reed; while being woven, reed is kept in water so as to make it pliable.

The lack of willow and the dissatisfaction over reed owing to its brittlness has caused furniture and basket makers to seek a new article. (Encyclopedia Americana)

Rattan.—stems (collectively) as used for building, basketwork, furniture, etc.

BRIEF DESCRIPTION OF THE DRAWINGS

The characteristics features of the present invention are also shown in the following description and in the drawings which accompany it.

FIG. 4 is a view of finished portion which has been colored, engraved and slotted, showing divisions and markings of an article resembling bamboo, rattan, cane, or the like.

FIG. 18 A is a detailed view of section A of FIG. 18 illustrating how the slots are formed on the tube surface.

DETAILED DESCRIPTION OF THE INVENTION

Figure 1:
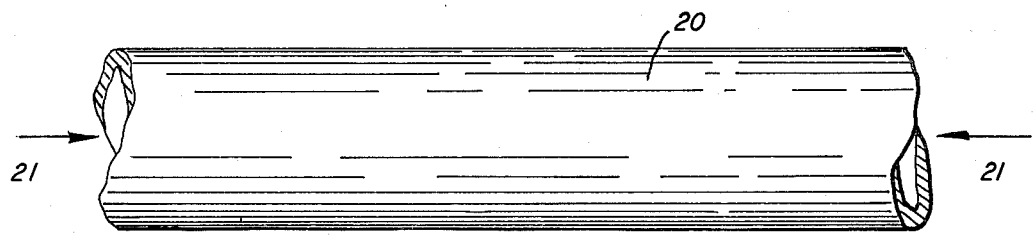
FIG. 1 is a view in lengthwise elevation showing the stage of applying heat and pressure to produce the knotty sections in a tubular portion.
Figure 2:
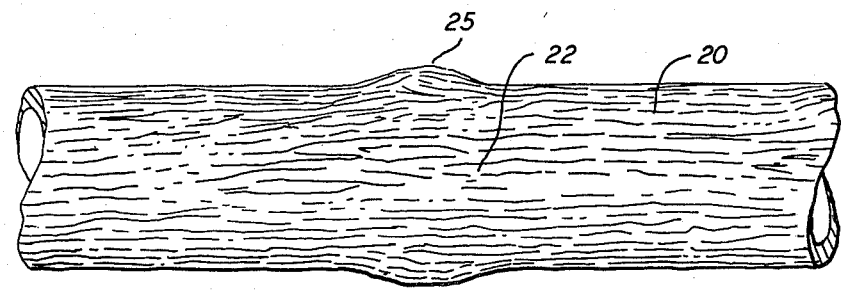
FIG. 2 is a view in lengthwise elevation showing a tubular portion with the typical joint shape produced.
Figure 3:
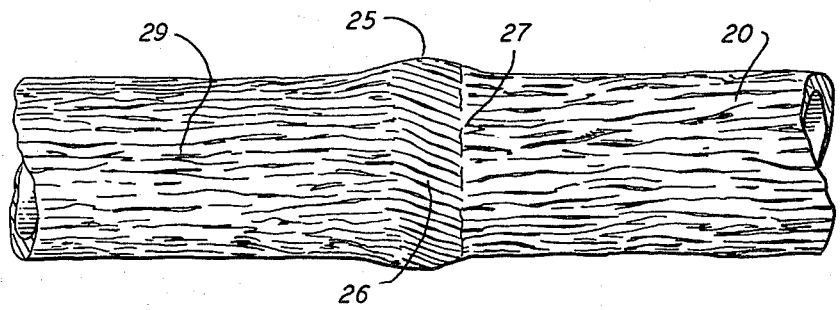
FIG. 3 is a view of a finished length which has been colored, engraved and slotted, with markings on the node.
Figure 4:
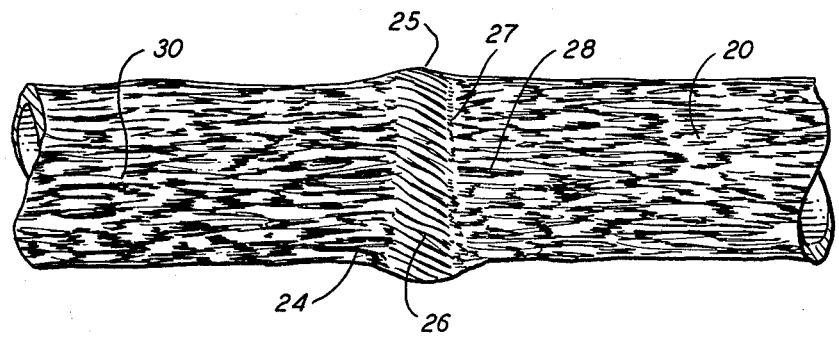

Referring now to the drawings, the procedure for producing synthetic articles identical in appearance and to the touch with rattan, bamboo, cane, reed, wicker, rush and similar natural materials according to the present invention consists of forming a tubular length 20 out of a rigid or semi-rigid thermoplastic material in any suitable color by a suitable tube making process, preferably by extrusion, which has the advantage of being seamless. The said tubular section 20 is chilled and becomes rigid; heat is then applied to selected portions of length 20 and pressure is applied from the sides as shown by arrows for the purpose of deforming the heating profile 22 outward, simulating nodal formation 25, as is shown in FIG. 2. When the wall of the tubular portion is very thin, it is desirable to introduce a shaper (not shown) inside the tube, to prevent it from warping or sucking in as the nodal portion 25 is formed. Tubular section is then cooled again, along with nodal portion 25, and the tubular portions are then colored and veined again as required; portion of tubular material 20 is again heated at the desired points to give it the shape and the bends required.

For producing articles similar to cane, reed, bamboo or wicker, grooves 24 are made, as well as spiral striations 26 and circular shallow incisions 27, in the selected portions, immediately after heating and before forming node 25, to simulate the separation of the joints in the natural material and also portion 28 which is caused when the leaf is torn from the trunk of the natural cane, reed or similar stem in natural materials, etc., by applying pressure to form the node and expanding the striations and incisions slightly.

The formation of the tubular length can be made by any known process, but as indicated above extrusion is preferred because it does not leave visible seams.

Figure 8:
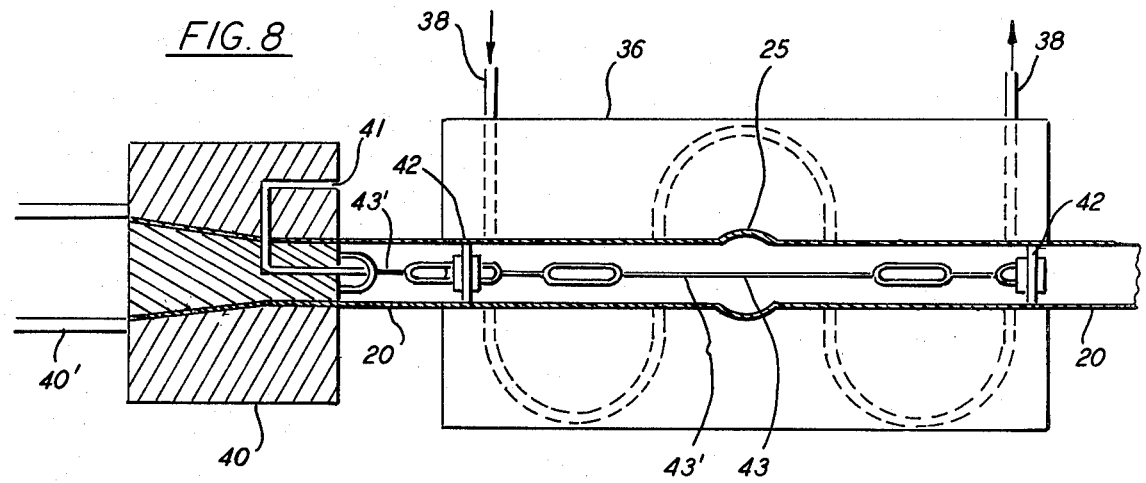
FIG. 8 illustrates an extrusion die and a traveling mold installation.
Figure 9:
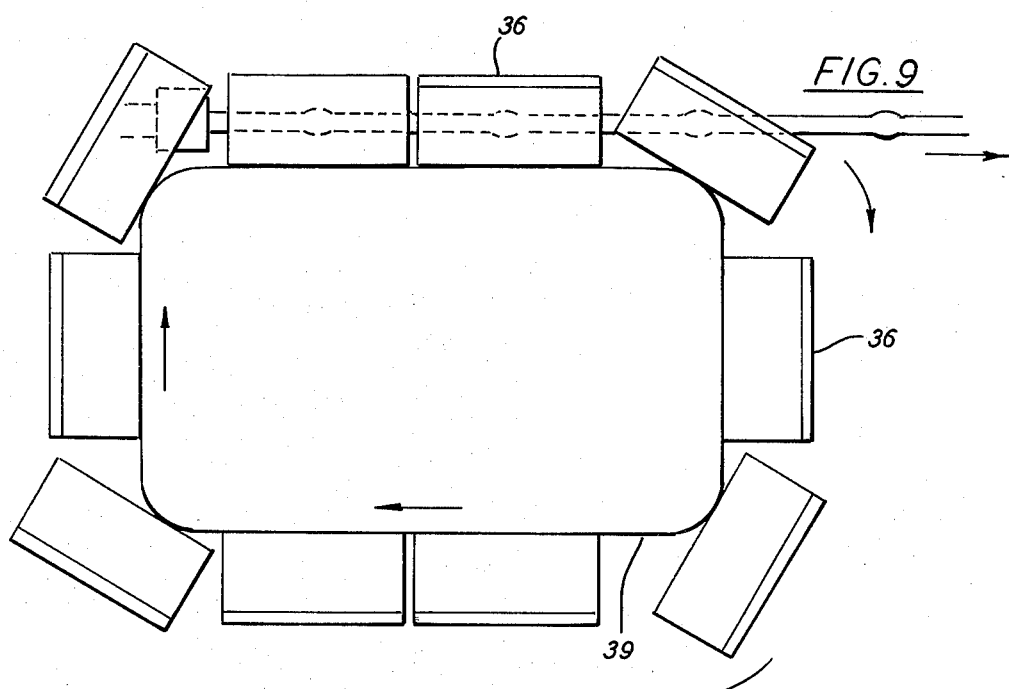
FIG. 9 illustrates the traveling molds in their traveling operation.
Figure 11:
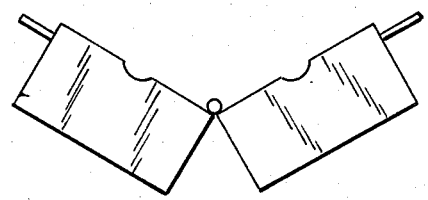
FIG. 11 illustrates a traveling mold and end view in its open position.
Figure 10:
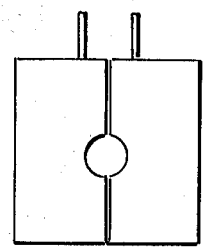
FIG. 10 illustrates one end view of one traveling mold in its closed position.
Figure 12:
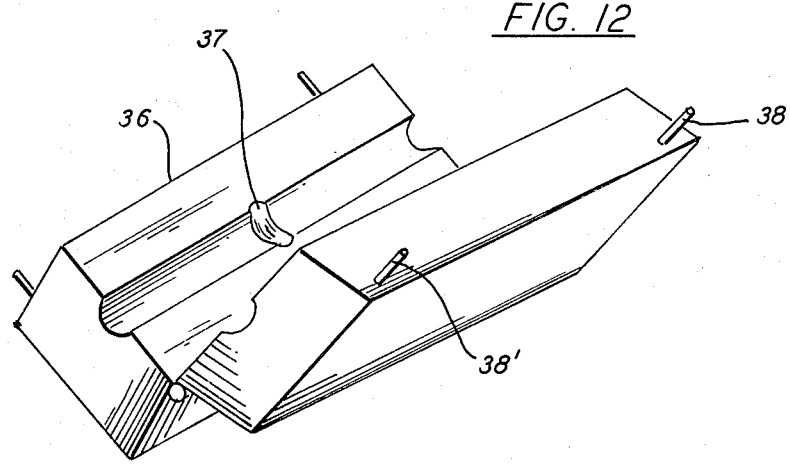
FIG. 12 illustrates a traveling mold in its open position such as that of FIG. 11 in a conventional perspective view.
Figure 13:
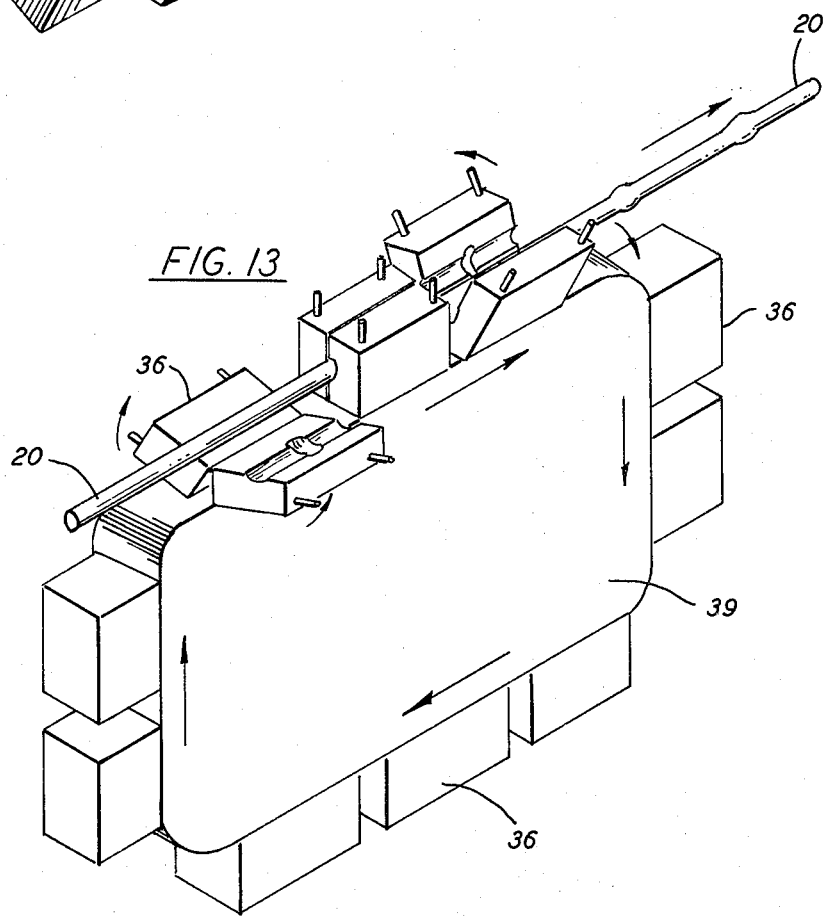
FIG. 13 illustrates a traveling mold of FIG. 9 in their traveling operation showing the molds in their close, open and semi-closing positions.

In one embodiment invention a thermoplastic tube 20 as illustrated in FIG. 8 is extruded as per extruder 40' and die 40 through whose central portion two pulley wheels 42 are held which are separated from each other by a smaller distance than the length of the traveling molds 36. Likewise, a tubular duct is connected to the die entering system while leaving air exit 43 between the two pulley wheels. The speed of the traveling molds is adjusted to coincide with the speed of the tube being extruded. The motion of the traveling molds is carried out by conventional motion means 39, and when one of the molds 36 is exactly below tube 20, the mold closes surrounding the tube while pressured air is fed through duct 41 leaving through exit 43, and as tube 20 is hot it will immediately take the shape of the mold because pulley wheels 42 prevent the air pressure to be lost. At the same time cold water is circulated from entrance 38 of the mold and leaving through exit 38' by which tube 20 is cooled, taking the shape imparted to it by the mold whose cavity 37 produces the nodal portion 25. During this operation the tube portion is also calibrated. When the said mold and the tube portion inside it, have traveled a distance equal to the mold length, the latter closes upon the tube that coincides with it, and the whole operation is then repeated for each mold in order to form other nodes and calibrating the tube portion.

Figure 14:
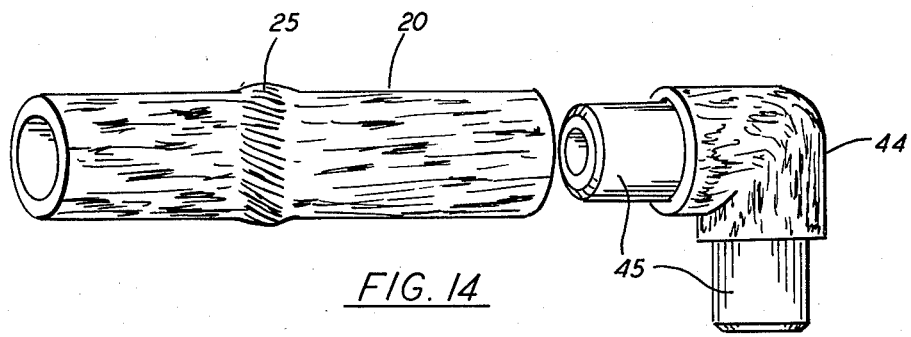
FIGS. 14 to 17 illustrates various manners by which the extruded tubes are connected before they are tied to form the structures of the invention.
Figure 16:
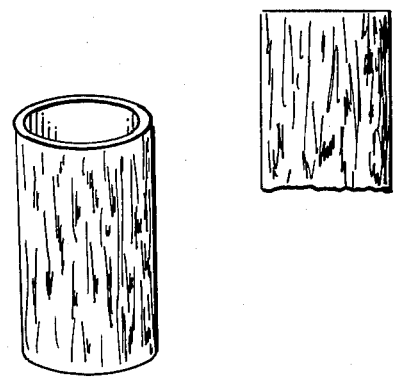
Figure 15:
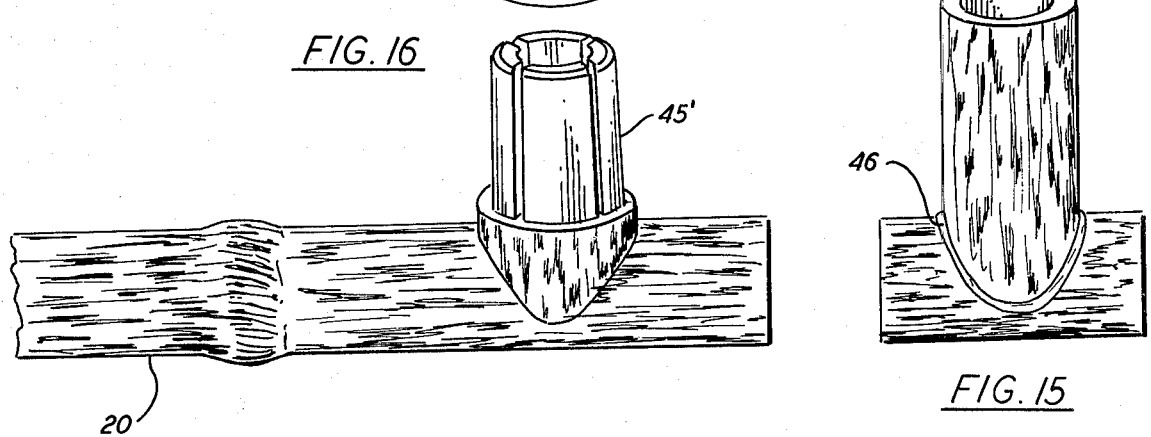
Figure 17:
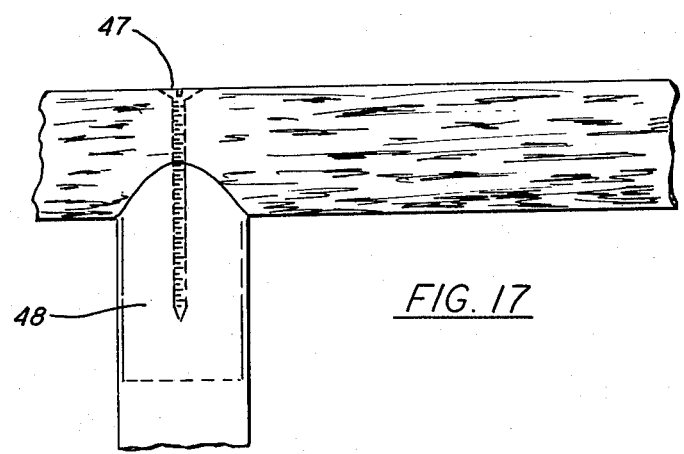

Once the tube portions are extruded as above, they are cut in desired lengths, or they may be bent so as to have them ready for assembling the desired structures. However, before they can be tied together to form the pieces of furniture such as illustrated in the enclosed photographs, they have to be connected by using connecting means such as illustrated in FIG. 14 that shows plug 45 and plug 45' as shown in FIG. 16. They can also be connected by welding such as welding element 46 of FIG. 15 or by the screw 47 and the plug 48 combination as shown in FIG. 17. After the portions are connected as indicated above they can be tied as per FIGS. 5 to 7.

Figure 18:
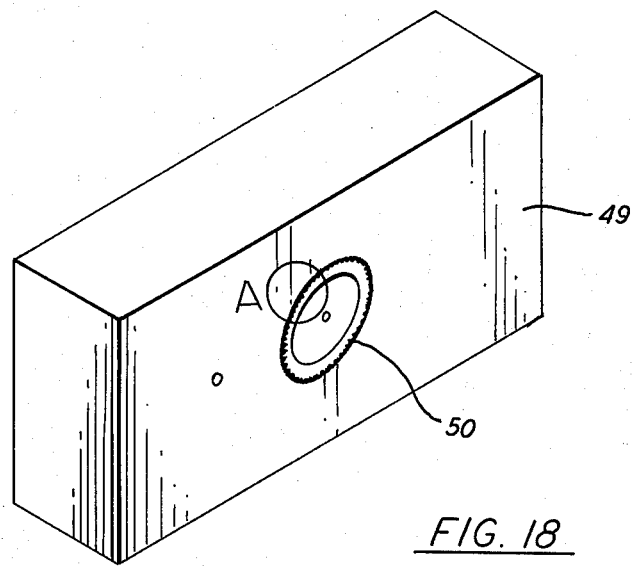
FIG. 18 illustrates a slotting mold by which the surface of the extruded tube is slotted.
Figure 19:
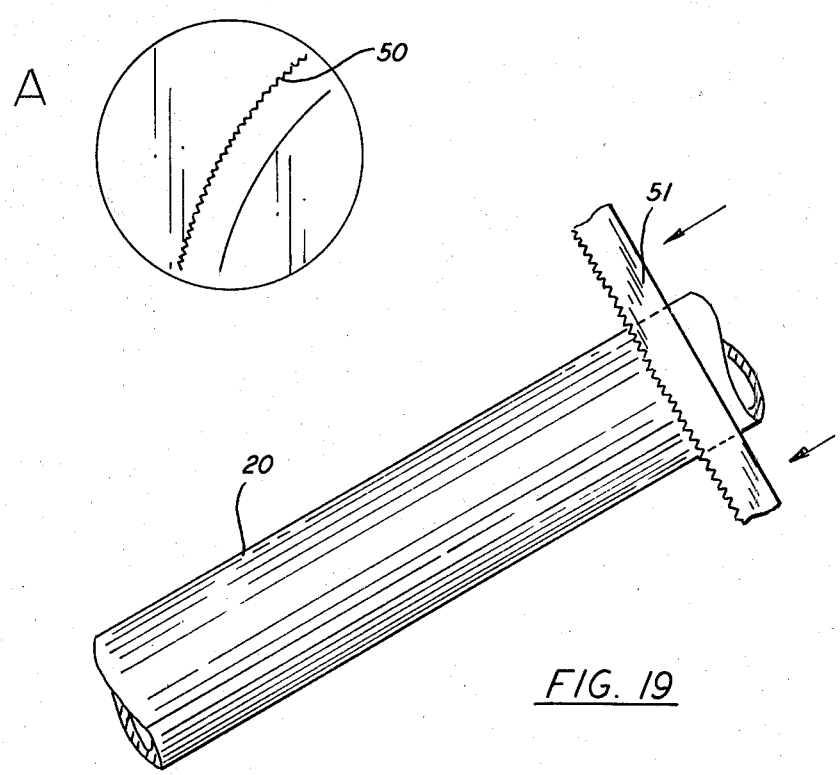
FIG. 19 illustrates a manual version to slot the surface of the tubes by a file used manually.

According to the invention another embodiment to be considered is that illustrated in FIGS. 18 and 19 in the former of which small slots are produced on the outer surfaces of the tubes by the slotting die 49 whose slotting section 50 produces the slots that resemble the surface of natural materials as bamboo and rattan. However, such operation can be peformed manually when smooth surface die is used, by using a file 51 such as that illustrated in FIG. 19.

Similarly, the node can be formed by inserting a suitable tool inside the tube to provide an outward deformation of the heated portion, or air or gas under pressure can be applied inside the tube to cause the heated portions to swell and simulate joints. In the tubular length the nodes can be distributed either with regularity or irregularly as desired, by means of the methods indicated.

A mold to provide the desired external appearance of the node or joint or intermediate surface can be placed around the outside of the heated portion of the PVC tube, and when the latter is expanded by gas or by a tool operating inside the PVC tube, the exterior surface will take on the surface texture of the mold surface.

The external mold may also have pores or slots communicating with a vaccumm source to draw and squeeze the softened tube material thereinto for further simulation of ridges and protruberances of the natural material imitated.

Below examples are given of preferred processes for coloring and graining synthetic thermoplastic materials to cause them to resemble wood, rattan, and similar natural materials.

EXAMPLE 1

Tubular portions 20 are prepared by extruding PVC thermoplastic material which already has a uniform base color similar to that of wood, as shown in FIGS. 3 to 7; a layer of suitable solvent which may be either tetrahydrofuran or methylene chloride is then applied over selected portions 29, 30 of the said surface for the purpose of dissolving a very thin layer of the surface of the portion and the veining is then applied using a suitable pigment dissolved in the solvent itself which may be a mixture of (Hoechst Chemical Co.):

(A)
1. Yellow Sol HR
2. Permanent Red TG-01
3. T₁O₂
4. Carbon Black
5. Ca CO₃, employing a suitable applicator such as cloth bag or brush, forming graining 29 or knobs 30 like knotty portions; finally, if desired, a light layer of varnish or a matte tone can be applied, or a mere coat of wax or matte lacquer.

EXAMPLE 1 A

The same procedure as in Example 1 is repeated except that Acrylonitrile-butadiene-styrene copolymer is extruded and acetone is used as the solvent.

EXAMPLE 1 B

The same procedure as in Example 1 is repeated but polystyrene is the material extruded and thinner is used as the solvent. The pigment used is Hoecht's Orango L-404 mixed with Brown L-701.

EXAMPLE 2

Tubular lengths 20 of thermoplastic material are prepared, with a uniform and integral base color similar to that of rattan; a solvent is applied over selected portions 29, 31 of the said surface to dissolve a light layer of material, and to this surface a suitable pigment is applied dissolved in the solvent itself, generally using pincers to produce the effect of knotty portions (not shown) and veins 29; the material is allowed to repose so the solvent will evaporate and thus allow the veining to form part of the stock itself, on its surface; finally if desired a light layer of varnish or lacquer may be applied.

EXAMPLE 3

Tubular length 20 are prepared with nodes, from a synthetic thermoplastic material having an integral base color similar to that of bamboo; a light layer of solvent is applied over selected portions (not illustrated) of the peripheral surface of the length for the purpose of dissolving a thin superficial layer of the surface, and manually spots and striations are applied around nodes 25, to give them the appearance of bamboo of the kind shown as Indian cane or Bengal reed.

Figure 5:
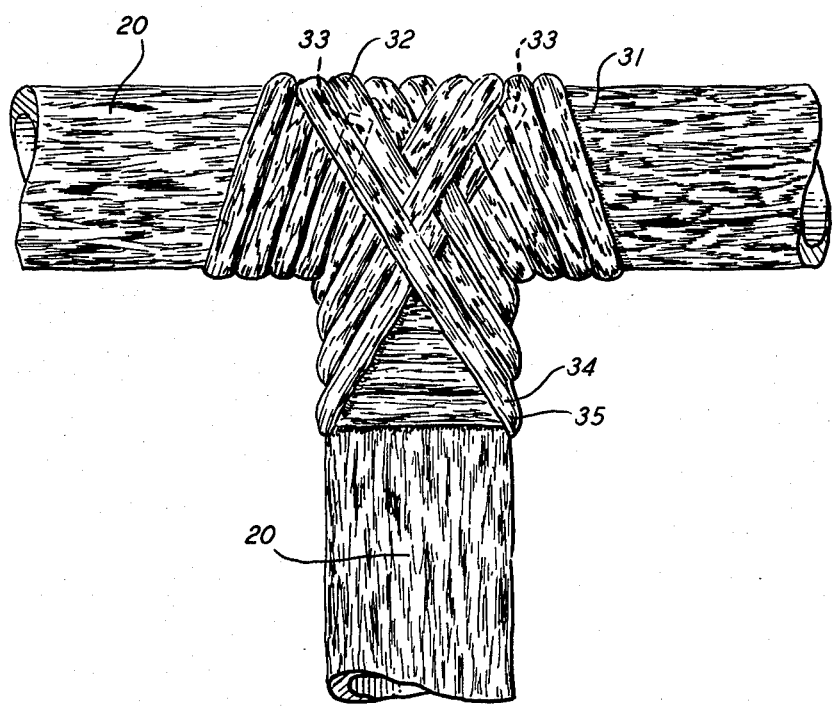
FIG. 5 is a view in elevation of two tubular lengths of thermoplastic synthetic material joined in a T. showing one way of tying or joining the lengths.
Figure 6:
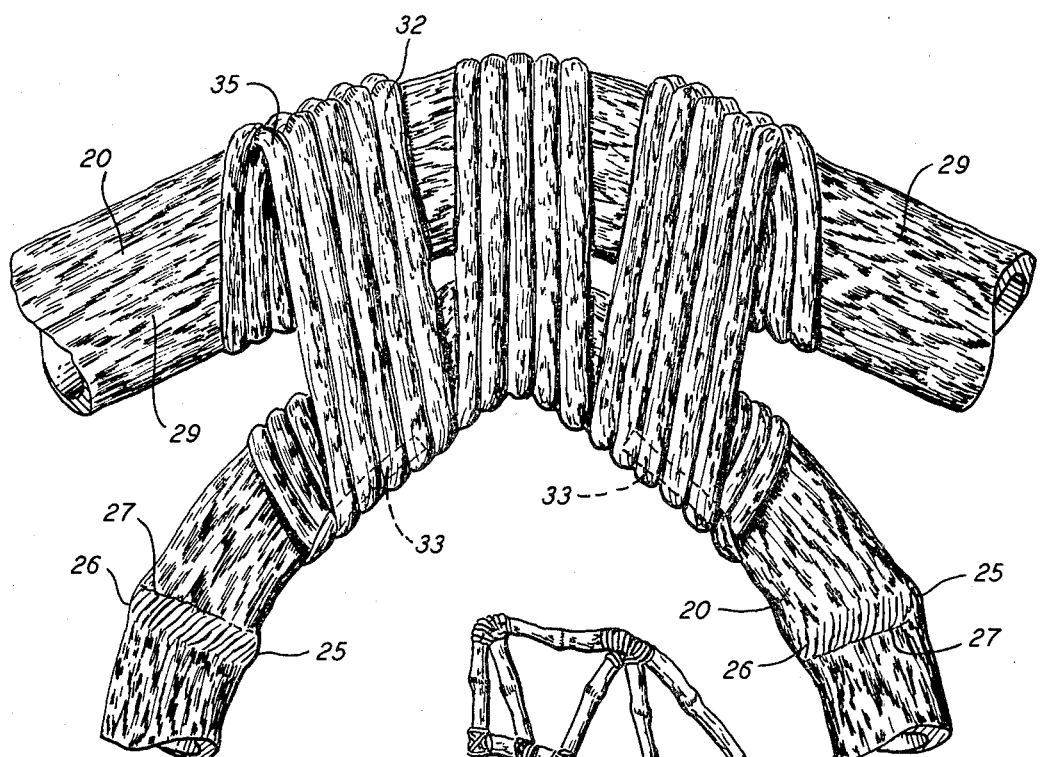
FIG. 6 is a view showing two tubular portions of synthetic thermoplastic material, indicating another manner of typing the tubular portions together.
Figure 7:
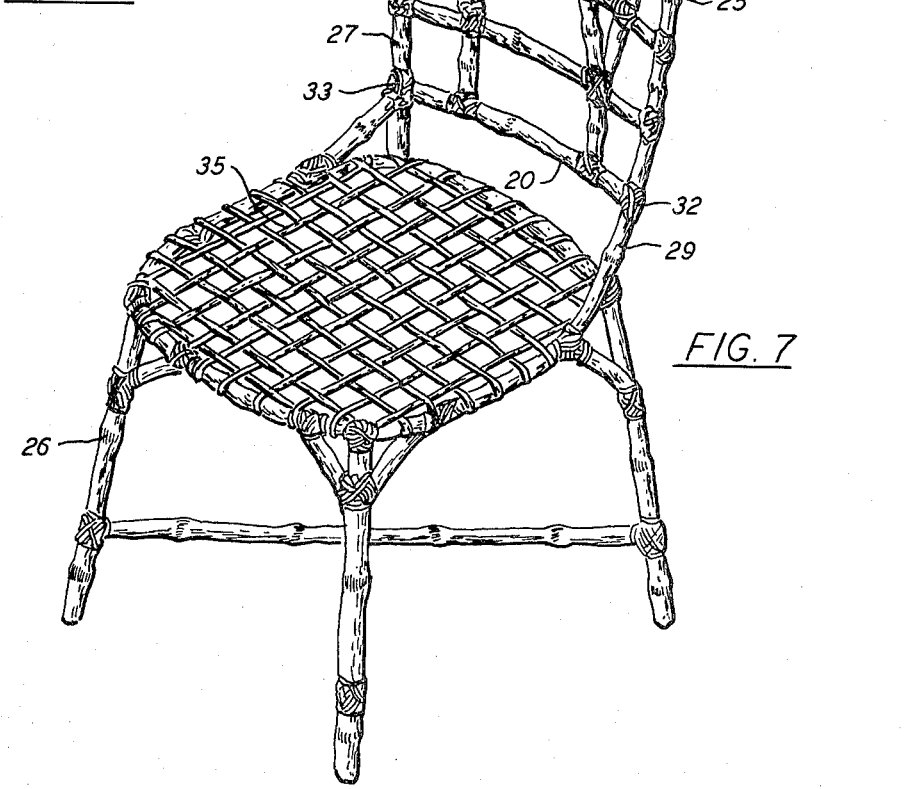
FIG. 7 is a view in conventional perspective of a finished piece of furniture showing the lengths of PVC which have been colored, veined, bent, brought together and tied with PVC strip.

Referring now to FIGS. 5 and 6, detailed illustration is made therein of ties consisting of a strip of PVC 32 over a structure of natural material 20 in one embodiment of the present invention.

The strap of PVC 32 is of one piece and is secured by means of interlacing 38 suitably at its ends which are tucked under; thus there is no need for using nails or tacks to secure it. PVC strap 32 exhibits striations 34 and graining 35.

The strap of PVC 32 with the stated characteristics gives the precise appearance and tactile sensation of a piece of furniture made entirely from natural materials and has also the firmness and strength of polyvinyl chloride.

Longitudinal striations 34 are formed on the strap of PVC used in this embodiment of the invention at the moment of its extrusion or subsequently, with a suitable tool. Veining 35 is accomplished in a manner similar to that for the tubular sections described above, again affording appearance and touch like that of furniture made from natural materials.

While the foregoing description is drawn to specific concrete embodiments of the invention, it will be understood by persons versed in the subject matter that changes in form and detail are within the scope and spirit of the present invention.

What is claimed is:

1. A method for producing artificial, tied tubular structures, the tying and the tubular portions of which have the appearance of natural materials, comprising the steps of:

extruding a thermoplastic tubular material having base coloring, separately extruding tying strips of basically colored thermoplastic material with striations formation on the surfaces thereof, longitudinally orienting the molecules of the material as it is being extruded whereby a molecular memory is imposed thereon, applying coloring to said strips of thermoplastic material by treating it with a solvent that at least partially disssolves said material, said solvent material having powdered polyvinyl chloride and a pigmenting material dispersed in it, whereby said thermoplastic material is made to resemble natural materials, heating preselected portions of the extruded tube after it leaves the extruding die and applying pressure to the heated portion to deform it so that the tube has deformed portions alternating with non-deformed portions, forming annular incisions in the hot deformed portions and peripheral striations as well as longitudinal incisions perpendicular to the said annular incisions, and then cooling the tube, applying to the surface of the tube a solvent for the material of the tube, pigmenting the extruded tube with pigment dispersed in the said solvent that has thermoplastic material dissolved in it so that the pigment will simulate veins on the surface of the tubular material, allowing the pigmented alternatively deformed tubular material to air-dry, cutting the tubular material processed by the foregoing steps into desired lengths, heating it at selected points to bend tubular lengths as may be required, and letting it cool; attaching connecting means to the ends of said cooled tubular portions, and tying together the cut tubular material by means of said strips of colored thermoplastic material after connecting them in such manner as to produce structural portions of furniture, ornaments, and structures in general made of natural looking materials such as wood, rattan, cane, reed, rush, bamboo, wicker and the like, the said strips becoming tightened when their oriented molecules recover their original position.

2. The method according to claim 1, in which the portions of tubular material which are heated for deforming are located at irregular intervals along the tube, to deform which a pressuring means is inserted whereby pressure is applied from the inside surface of the heated portions to deform the said heated portions forming protuberances in each of said irregular intervals.

3. The method according to claim 1, in which the portions which are heated and distributed along the tube at intervals, are deformed into protuberances by means of injecting gas under pressure from the inside of the tube.

4. The method according to claim 4 in which the heated portions are subjected to suction applied to the outside surface, so that the atmospheric pressure will deform said portions into protuberance shapes.

5. The method according to claim 3 in which the protuberances resulting from the application of pressure have a circular configuration resembling the knotty portions of natural materials such as wood, rattan, cane, reed, rush, wicker and the like.

6. The method according to claim 1, in which the connection of the cooled tubular portions is performed by soldering.

7. The method according to claim 1, in which the connecting means is a plastic stopper and screw combination whereby two separate tubular portions are connected as one of them carries the stopper at one of its ends and the other carries the screw across its body.

8. The method according to claim 1 in which the connecting means is an injected plastic connector assembly glued to the ends of the tubular portions.

9. The method according to claim 1 in which the extruded tubular thermoplastic material is selected from the group consisting in polyvinyl chloride, high impact polystyrene and ABS (Acrylonitrile-Butadiene-Styrene Copolymer).

10. The method according to claim 1, in which the connecting means is a plug piece welded to the surface of one of the tubes and gluded to the end of the other tube.

11. The method according to claim 1 in which the connecting means is a plug piece that is screwed to the surface of one of the tubes and glued to the end of the other tube.

12. The method of claim 1, in which the extruded typing strips are made of flexible polyvinyl chloride.

13. The method according to claim 1, in which the solvent is selected from tetrahydrofuran, methylene chloride, acetone and thinner.

14. The method according to claim 1, in which a knotty formation is produced by means of a travelling mold during the process of extrusion of the tube.

15. The method in accordance with claim 1, in which the surface of the tubular portion is slotted by means of a grooving extrusion die so that the resulting slotted portion will simulate the superficial porosities of materials such as wood, rattan, bamboo, cane, reed, wicker and the like.

16. The method as set forth in claim 15, in which the extruded tubular material is manually grooved, so that it will simulate the surface porosity of materials such as wood, rattan, bamboo, cane, reed, wicker and the like.

17. The method as set forth in claim 1, in which the tube which is deformed under heat has a tool inserted as a core to prevent excessive contraction of the deformed portions.

18. A method of forming a knot in an extruded tube comprising the steps of:
  (a) extruding a thermoplastic material through a die, said die being incorporated in a travelling mold and having an elongated central portion accommodating two pulley wheels separated by a distance shorter than the length of the cavity,
  (b) feeding air through an air duct of the die, expelling said air through an air exit situated between said two pulleys wheels inside the extruded tube at a recessed cavity of the travelling mold when said mold travels at a speed adjusted to coincide with that of the tube as it is being extruded so that when the traveling mold is below the tube, it closes whereby said fed air causes the still hot extruded tube to adopt the shape of a knot by pressing it against said recessed cavity, and
  (c) simultaneously circulating cooling water through the travelling mold whereupon the extruded tube becomes rigid and the mold is open, leaving a nodal portion on the cooled tube.

19. The method according to claim 18, wherein a continuous formation of knotty portions of the extruded tube are produced by carrying out the method utilizing an assembly comprising a series of molds.

20. A two piece travelling mold wherein the two pieces are essentially symmetrical and hinged by the lower edge of their inner surfaces, having each of them a lengthwise cavity along their mid-portion, and at their center of the cavity length there is an irregular deeper recessed cavity, said lengthwise cavity forming a molding duct when the mold hinged pieces rotate about their hinge so that their inner surfaces come together to close the mold.

21. The travelling mold according to claim 20, wherein said two pieces have means for circulating water to cool them.

22. The travelling mold according to claim 20, in combination with other similar molds forming an assembly in which the molds travel attached to conventional motion means.

* * * * *